(12) United States Patent
Baek

(10) Patent No.: US 10,377,406 B2
(45) Date of Patent: Aug. 13, 2019

(54) TWICE-FOLDABLE STROLLER

(71) Applicants: Sung ho Baek, Seoul (KR); Xing Ding

(72) Inventor: Sung ho Baek, Seoul (KR)

(73) Assignees: Sung ho Baek, Seoul (KR); Xing Ding, Dongguan (CN)

( * ) Notice: Subject to any disclaimer, the term of this patent is extended or adjusted under 35 U.S.C. 154(b) by 0 days.

(21) Appl. No.: 15/845,279

(22) Filed: Dec. 18, 2017

(65) Prior Publication Data

US 2019/0061799 A1 Feb. 28, 2019

(30) Foreign Application Priority Data

Aug. 29, 2017 (KR) ........................ 10-2017-0109213

(51) Int. Cl.
*B62B 7/10* (2006.01)

(52) U.S. Cl.
CPC .......... *B62B 7/105* (2013.01); *B62B 2205/02* (2013.01)

(58) Field of Classification Search
CPC .......... B62B 7/08; B62B 7/062; B62B 7/064; B62B 2205/20; B62B 7/06; B62B 9/26; B62B 7/068; B62B 9/20; B62B 7/008; B62B 7/10
See application file for complete search history.

(56) References Cited

U.S. PATENT DOCUMENTS

| 2009/0121455 | A1* | 5/2009 | Kretschmer | B62B 7/062 |
| | | | | 280/642 |
| 2009/0278335 | A1* | 11/2009 | Dotsey | B62B 7/10 |
| | | | | 280/647 |
| 2010/0201104 | A1* | 8/2010 | Jacobs | B62B 9/18 |
| | | | | 280/650 |
| 2017/0313338 | A1* | 11/2017 | Ma | B62B 7/10 |

FOREIGN PATENT DOCUMENTS

| CN | 104176101 B | 9/2016 |
| JP | 2009-073479 A | 4/2009 |
| JP | 2011-509862 A | 3/2011 |
| JP | 2013-224143 A | 10/2013 |
| KR | 10-2017-0070093 A | 6/2017 |

* cited by examiner

*Primary Examiner* — James A Shriver, II
*Assistant Examiner* — James J Triggs
(74) *Attorney, Agent, or Firm* — Birch, Stewart, Kolasch & Birch, LLP

(57) ABSTRACT

A twice-foldable stroller including a frame main body which is configured to have right and left front-angle frames to support front wheels and a horizontal frame connected at a lower part between the right and left front-angle frames, right and left rear-angle frames to support rear wheels and connecting frames connected between the right and left rear-angle frames and the right and left front-angle frames, and vertical frames connected to the right and left connecting frames; seat frames; backrest frames; support frames; extension frames; canopy frames rotatably connected to the extension frames; and handles, each connected to the exten- (Continued)

sion frames, wherein right and left central portions are rotatably connected to each other.

5 Claims, 10 Drawing Sheets

TWICE-FOLDABLE STROLLER

BACKGROUND OF THE INVENTION

1. Field of the Invention

The present disclosure relates to a stroller, more particularly, to a twice-foldable stroller which significantly reduces volume by folding again vertically when being in a horizontally folded state.

2. Description of the Related Art

Stroller products have been widely used, and it has become much more convenient to put a child in a stroller to take a walk while pushing the stroller. However, when carrying and storing a stroller, there is the problem of the stroller occupying too much space. For example, normally, a stroller in a state of being used cannot be put inside the trunk of a car.

To solve such a problem, strollers having folding functions are now very popular. However, these strollers can be folded only once at most, and in an actual situation, there remains the problem of the stroller taking up a relatively large space due to being folded in only one direction. Therefore, these still cannot satisfy user's volume requirements.

In view of such situation, a "twice-foldable child stroller" developed to further reduce the volume occupied by a stroller in a folded state is disclosed in Korean Patent Laid-Open Publication No. 2017-0070093 (see Patent Document 1).

The "twice-foldable child stroller" of Korean Patent Laid-Open Publication No. 2017-0070093 includes, side support assemblies located at opposite sides and at least one transverse rod 23, 317 connecting the side support assemblies of the opposite sides, wherein the side support assembly of each side of the stroller includes adjustment rods 5, 6, 7, 8, 11, 12, 13, 14, front wheel supports 27, and rear wheel supports 20, 21, 25, 26, which are rotatably connected to each other, as shown in FIG. 1 and FIG. 2. Each of the transverse rods 317 has a first transverse folding rotation point and a second transverse folding rotation point. When the side support assembly is in a first folded state, the adjustment rods 5, 6, 7, 8, 11, 12, 13, 14, the front wheel support 27, 28, and the rear wheel support 20, 21, 25, 26 located at the same side are rotated to be in a closed state, and the side support assemblies of the opposite sides in the first folded state are rotated about the first transverse folding rotation point and the second transverse folding rotation point, respectively, to get folded into closer proximity in a mutually facing form. A transverse rod 910 is provided between push-pull rods 8, 9. Front wheel support connectors 181, 182 are rotatably connected via rotation points C1, C2, respectively. The front wheel support 28 and rear wheel support 20 are mutually rotatable via a frame connector 15, and the front wheel support 27 and rear wheel support 26 are mutually rotatable via a frame connector 4. The push-pull rod 14 and the front wheel support 28 are rotatably connected to the frame connector 15 via rotation point A2 and rotation point B2, respectively, and the push-pull rod 5 and the front wheel support 27 are rotatably connected to the frame connector 4 via rotation point A1 and rotation point B1, respectively. A front wheel assembly provided at one side includes a front wheel 1 and front wheel connector which are interconnected, and a front wheel assembly provided at the opposite side includes a front wheel 19 and a front wheel connector 16 which are interconnected. A rear wheel assembly provided at one side includes a rear wheel and a rear wheel connector 21 which are rotatably connected to each other, and a rear wheel assembly provided at an opposite side includes a rear wheel 24 and a rear wheel connector 25 which are rotatably connected to each other. The front wheel connector 2 and a front wheel support connector 18 is rotatably connected via point C1, and the front wheel connector 16 and a front wheel support connector 182 are rotatably connected via point C2. The rear wheel connector 21 and the rear wheel support 20 are rotatably connected via rotation point D1, and the rear wheel connector 25 and the rear wheel support 26 are rotatably connected via rotation point D2. Due to such configuration, volume can be further reduced.

However, the twice-foldable child stroller is configured to have push-pull adjustable rods 11, 12, 13 fitted and inserted in the push-pull adjustable rod 14 with a relatively big inner circumference, and push-pull adjustable rods 8, 7, 6 to be fitted and inserted in the push-pull adjustable rod 5 with a relatively big inner circumference. Thereby, faults frequently occurred where the push-pull adjustment rods 11, 12, 13 didn't fit in the push-pull adjustment rod 14 or the push-pull adjustment rods 8, 7, 6 didn't fit in the push-pull adjustment rod 5, and therefore, cases of not being able to fold the stroller frequently occurred.

As a prior art related thereto, there is Korean Laid-Open Patent Publication No. 2017-0070093.

SUMMARY OF THE INVENTION

Therefore, the present disclosure is directed to solve the several faults and problems of the conventional twice-foldable strollers, and directed to provide a twice-foldable stroller which significantly reduces volume by folding again vertically when being in a horizontally folded state.

The present disclosure is also directed to provide a twice-foldable stroller which has a simple structure, enabling easy manufacturing at a low cost as well as enabling convenient use, and can be used stably long term without breaking, which is economical and long lasting.

According to an embodiment of the present disclosure, a twice-foldable stroller may include, a frame main body 100 which is configured to have right and left front-angle frames 101 to support front wheels 101a and a horizontal frame 101' connected at a lower part between the right and left front-angle frames 101, right and left rear-angle frames to support rear wheels 102a and connecting frames 102' connected between the right and left rear-angle frames 102 and the right and left front-angle frames 101, and vertical frames 103 connected to the right and left connecting frames 102'; seat frames 200 connected to the right and left vertical frames 103; backrest frames 300 rotatably connected to the seat frames 200; support frames 400 which connect and support respective backrest frames 300; extension frames 500, each connected to the right and left front-angle frames 101 via rotational axes R3 and R4, respectively; canopy frames 600 and 600' rotatably connected to the extension frames 500 for sunshade; and handles 700 and 700', each connected to the extension frames 500 wherein right and left central portions are rotatably connected to each other, wherein each of the front wheels 101a and the front-angle frames 101 are rotatable via rotational axes R1 and R2, the front-angle frames 101 and the extension frames 500 are rotatable via rotational axes R3 and R4, and the handles 700 and 700' are rotatable via a rotational axis R5.

According to the present disclosure, it is possible to significantly reduce the volume of a stroller by folding it twice, in which the stroller is folded again vertically when being in a horizontally folded state, and since it has a simple structure, it is possible to easily manufacture at a low cost as well as convenient to use, and can be used stably long term without breaking, which is economical and long lasting.

DETAILED DESCRIPTION OF THE INVENTION

Hereinafter, the present disclosure will be described in more detail with reference to the accompanying drawings, in which exemplary embodiments of the invention are shown.

Figure 1:
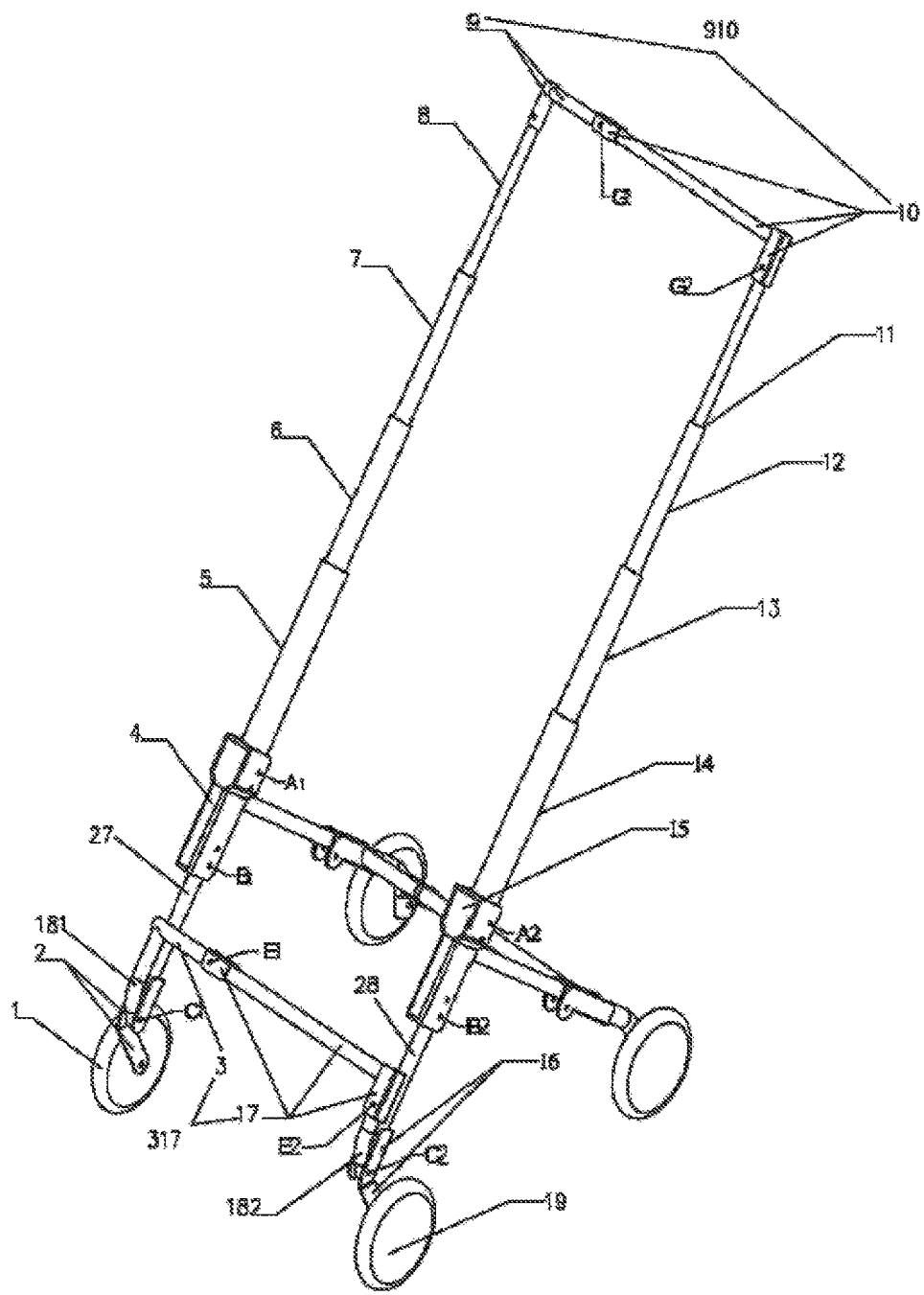
FIG. 1 is a perspective view illustrating an aspect of a state of use of a conventional twice-foldable stroller.
Figure 2:
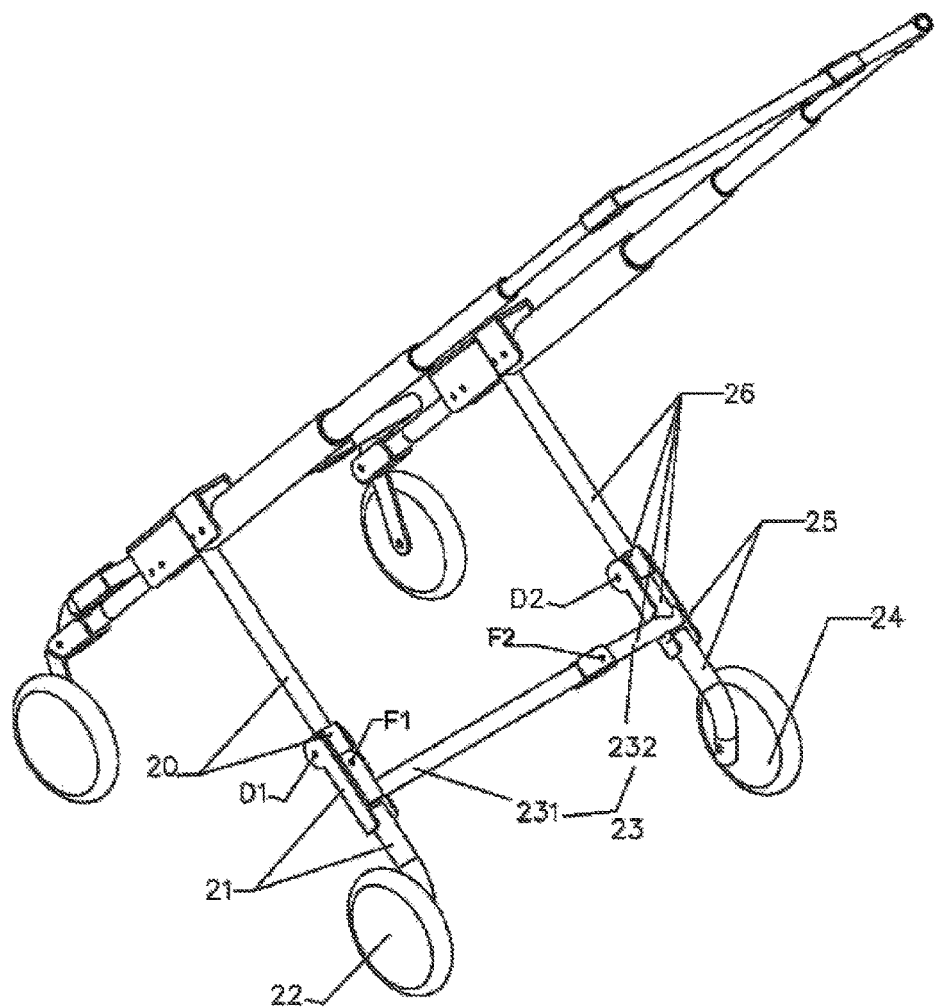
FIG. 2 is a perspective view illustrating another aspect of a state of use of a conventional twice-foldable stroller.
Figure 3:
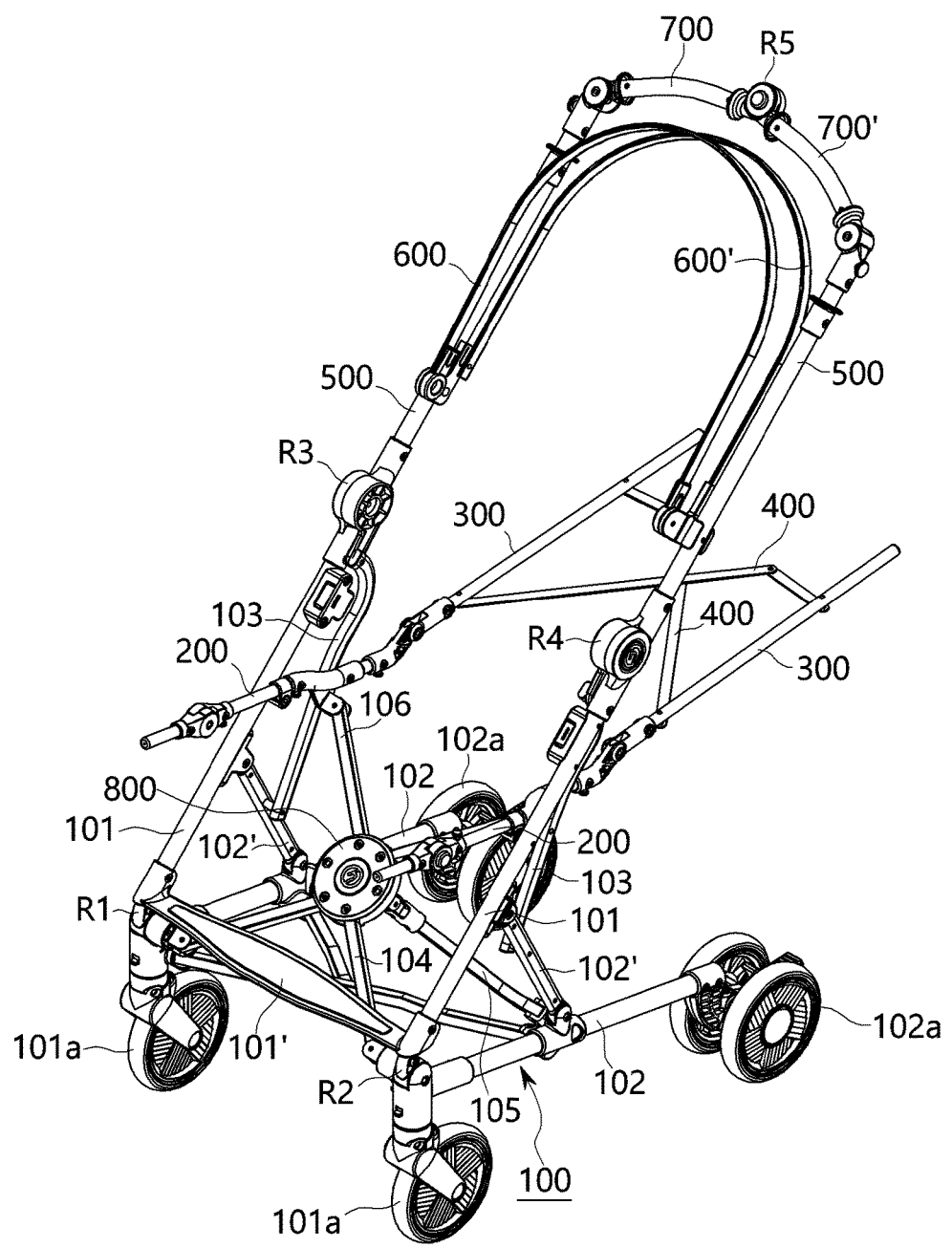
FIG. 3 is a front perspective view of a twice-foldable stroller according to an embodiment of the present disclosure.
Figure 4:
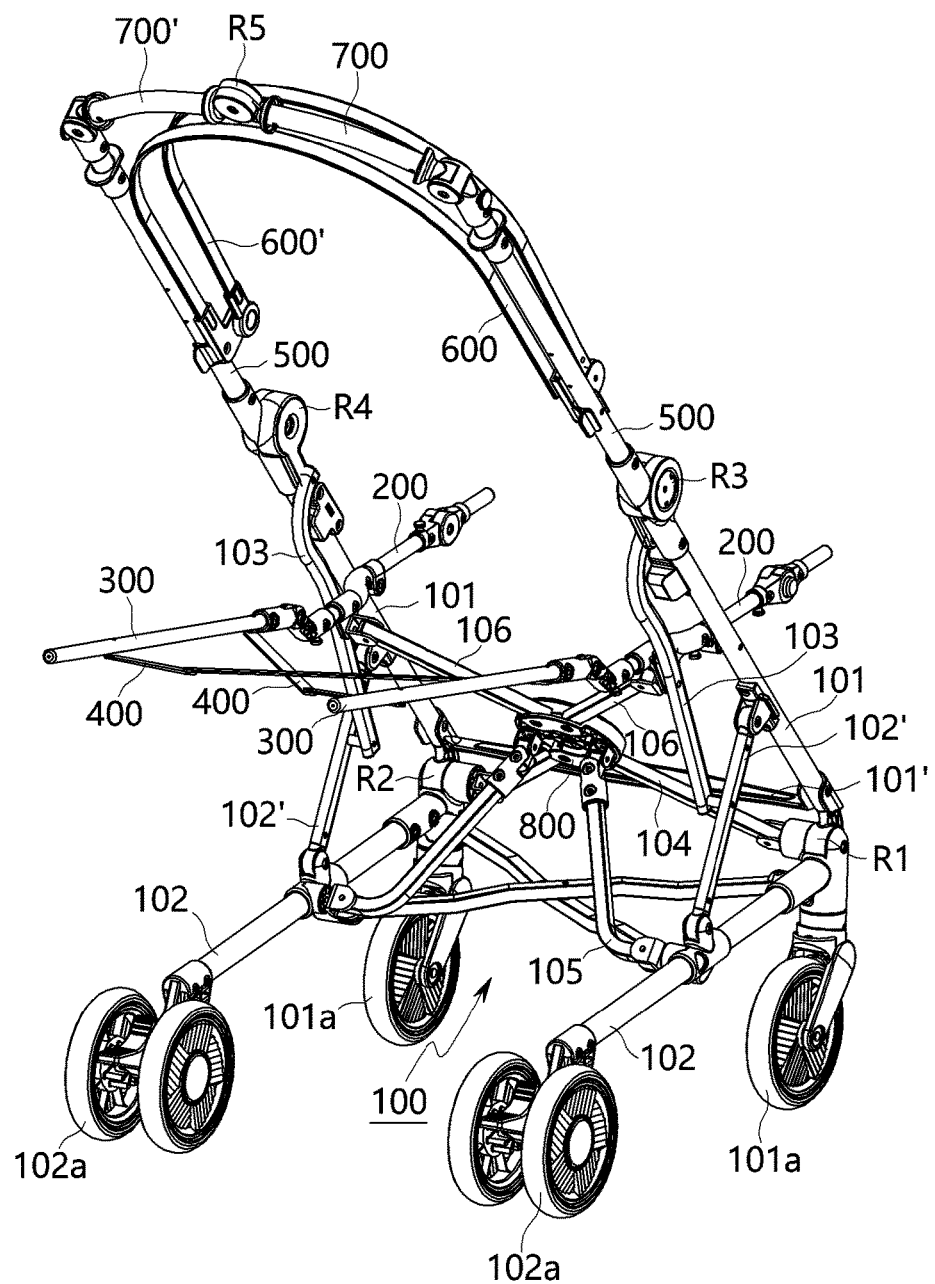
FIG. 4 is a rear perspective view of a twice-foldable stroller according to an embodiment of the present disclosure.
Figure 5:
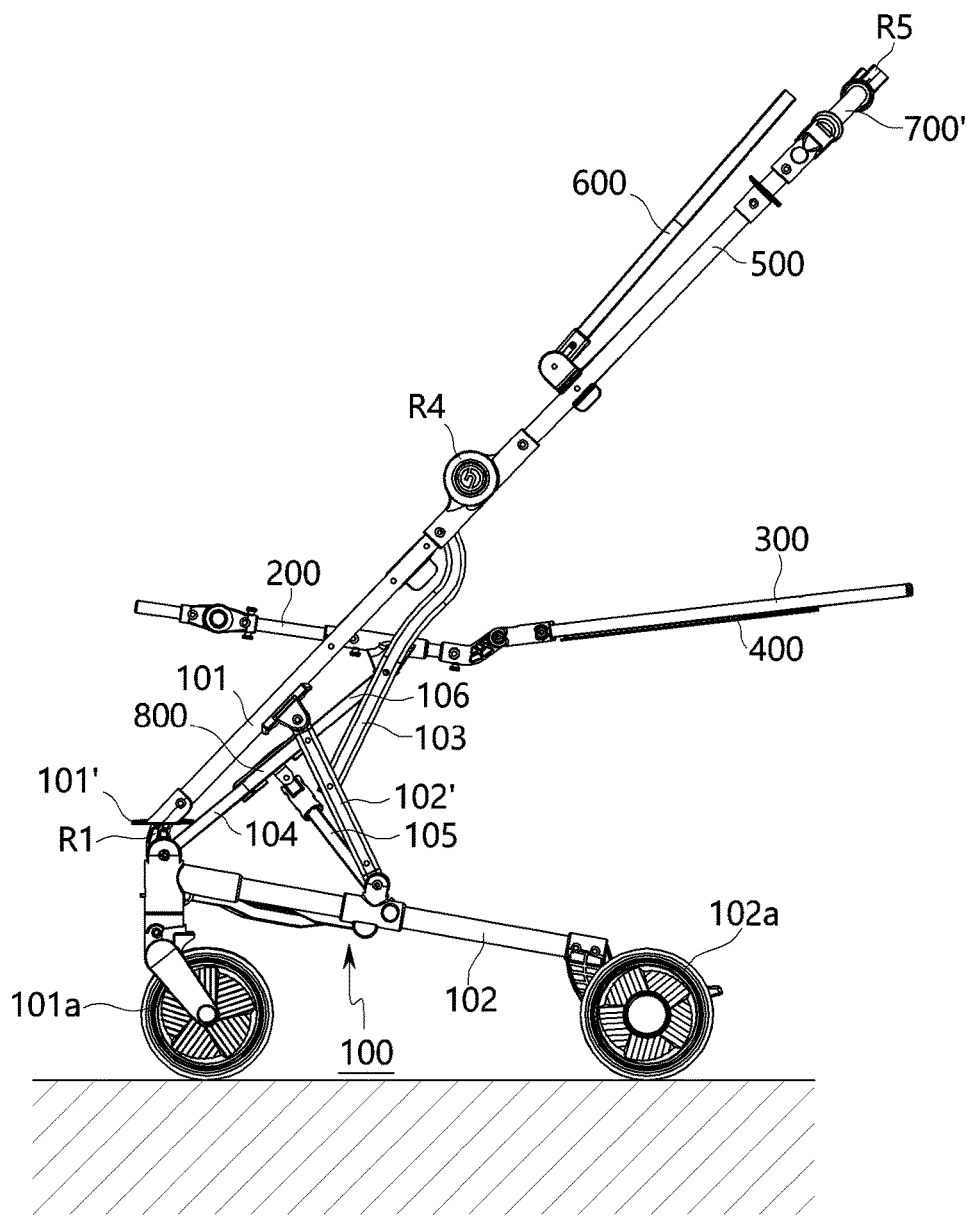
FIG. 5 is a side view of a twice-foldable stroller according to an embodiment of the present disclosure.
Figure 6:
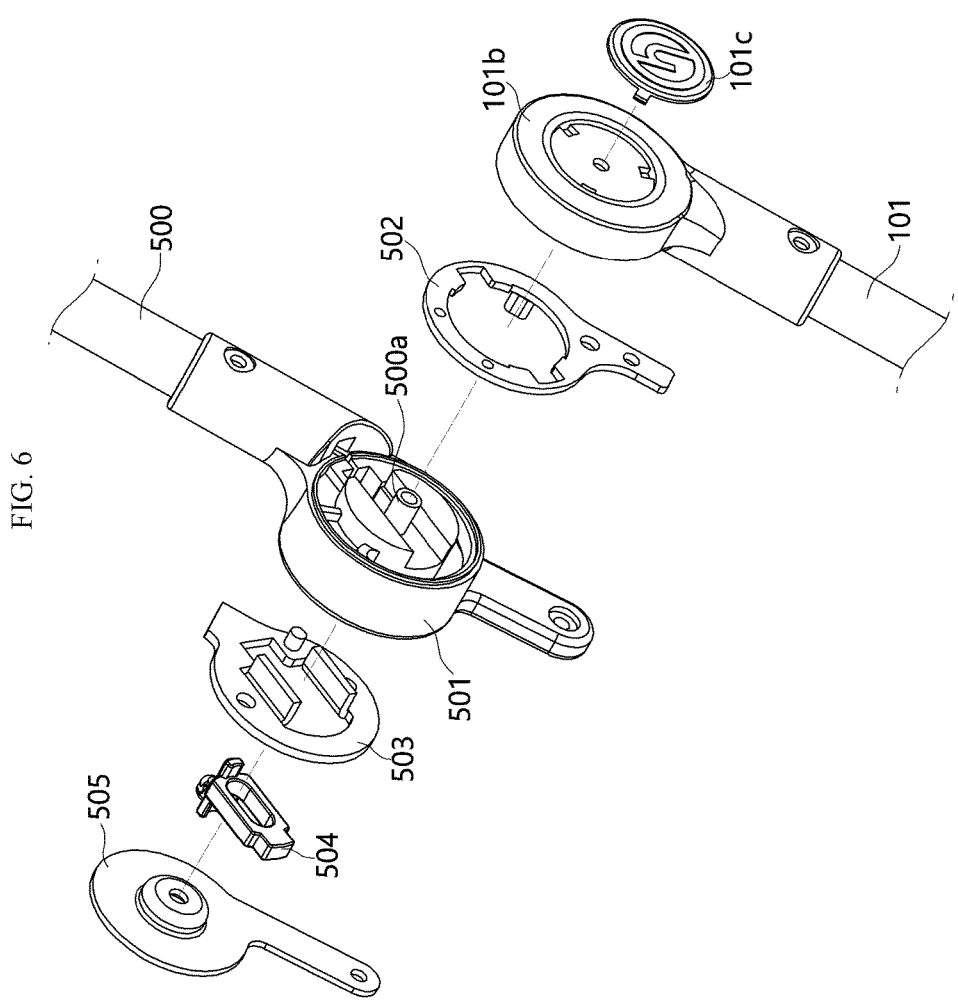
FIG. 6 is an exploded perspective view of an axis connecting part according to an embodiment of the present disclosure.
Figure 7:
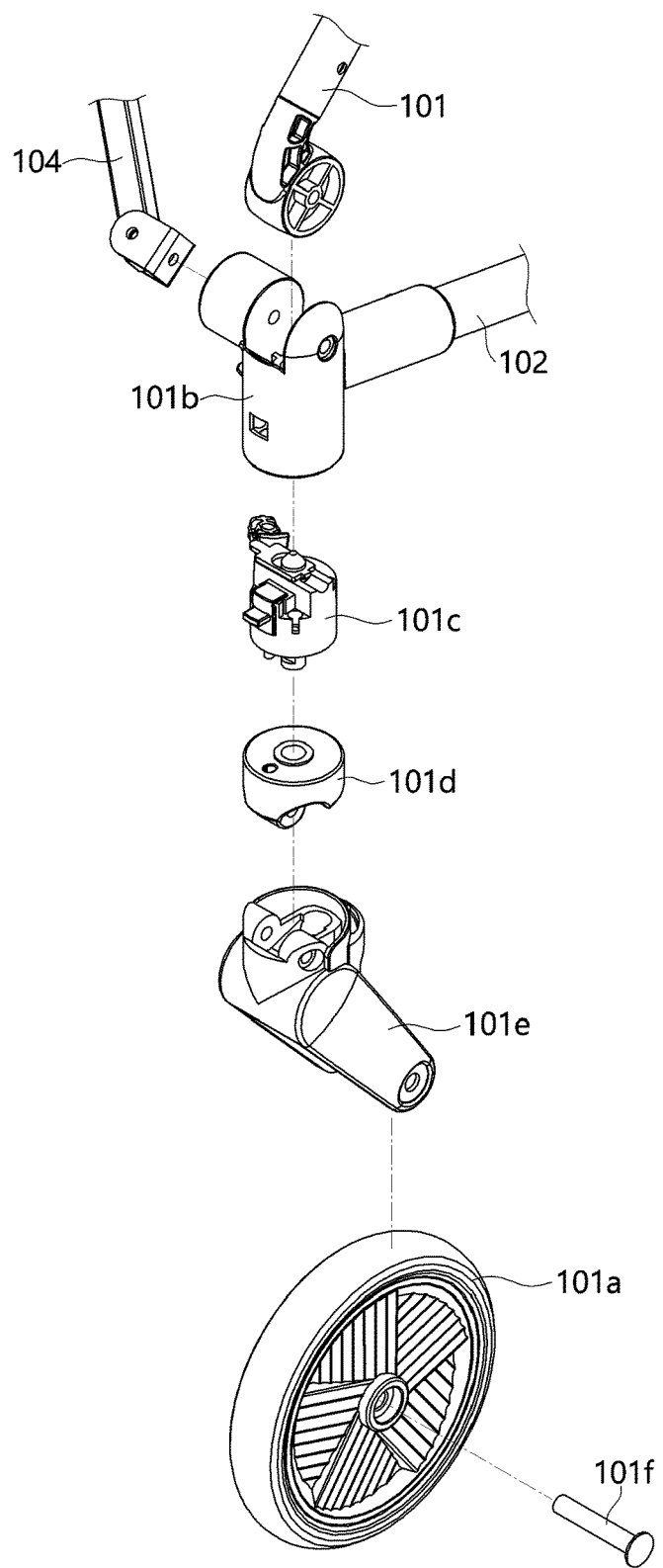
FIG. 7 is an exploded perspective view of a front wheel portion according to an embodiment of the present disclosure.
Figure 8A:
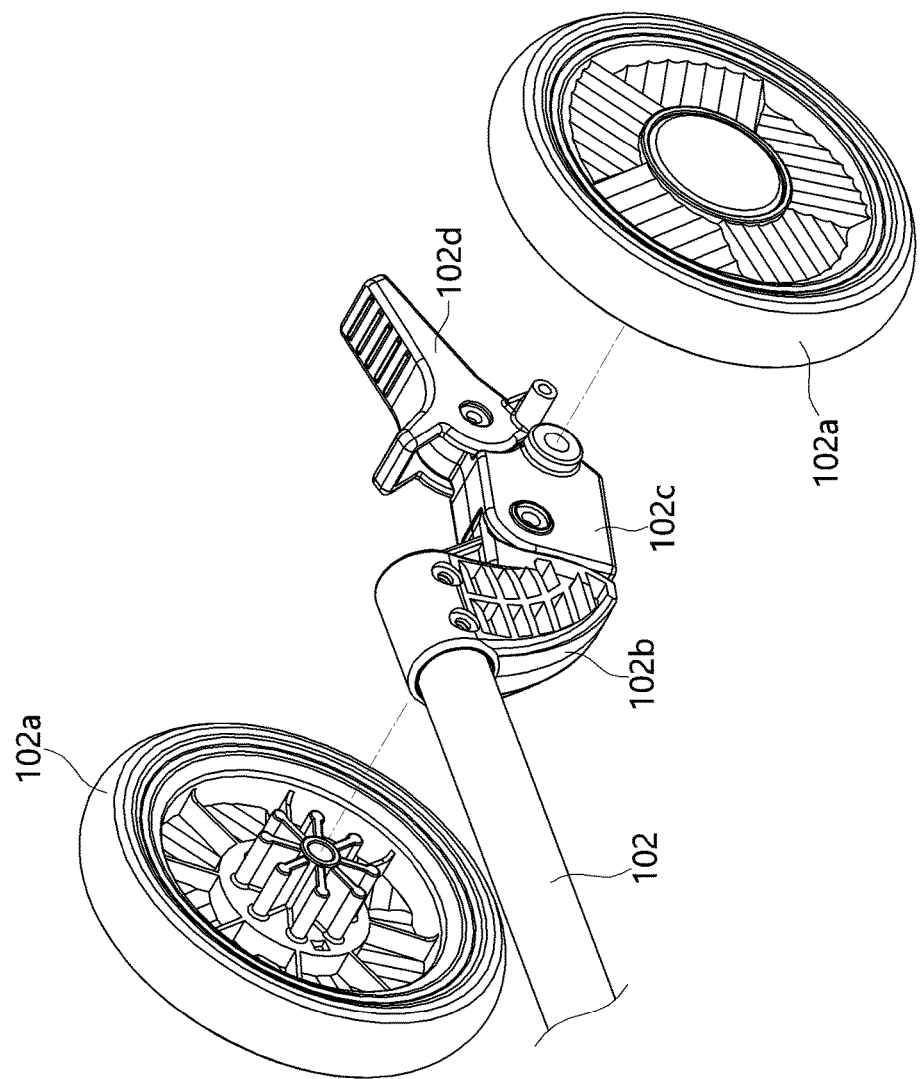
FIG. 8A and FIG. 8B are exploded perspective views of a rear wheel portion according to an embodiment of the present disclosure.
Figure 8B:
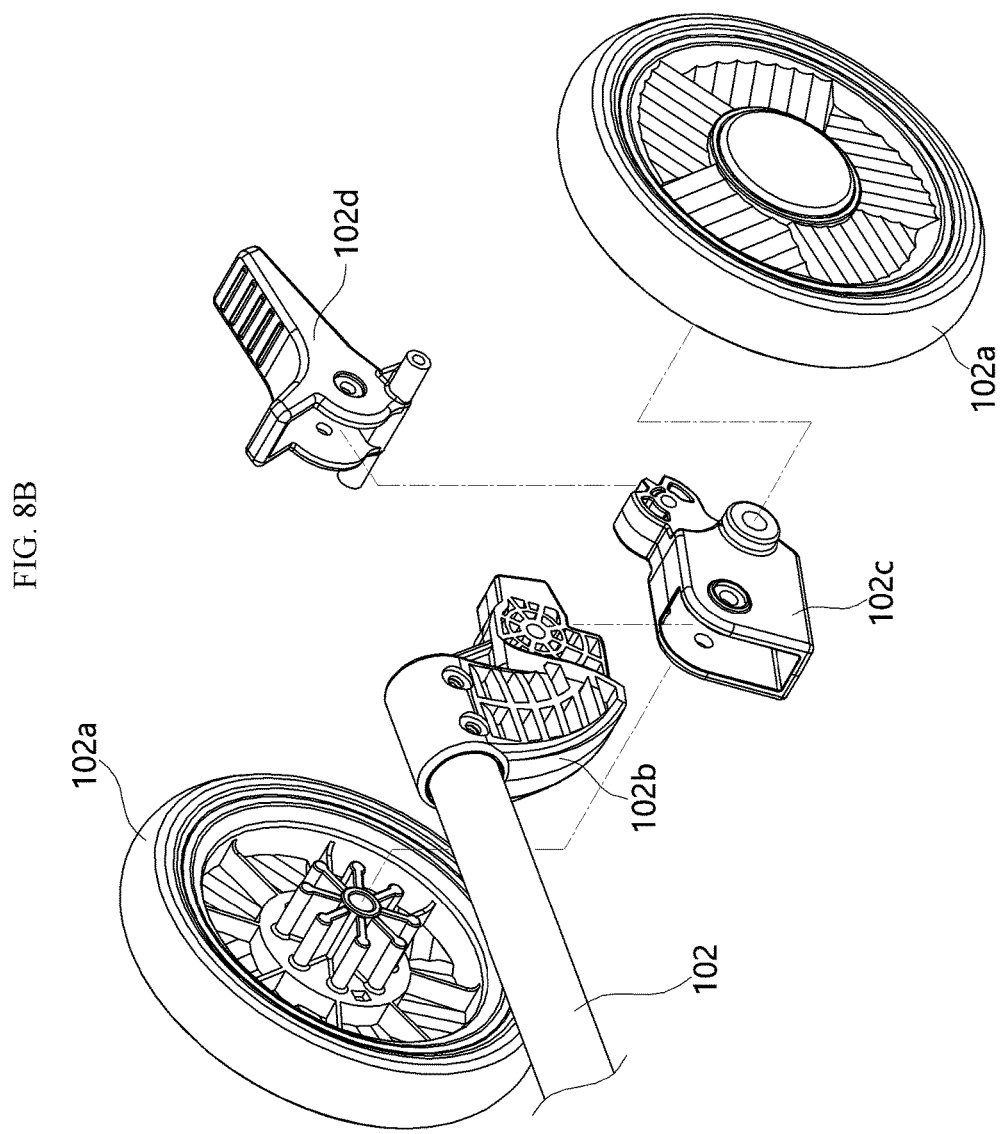
Figure 9:
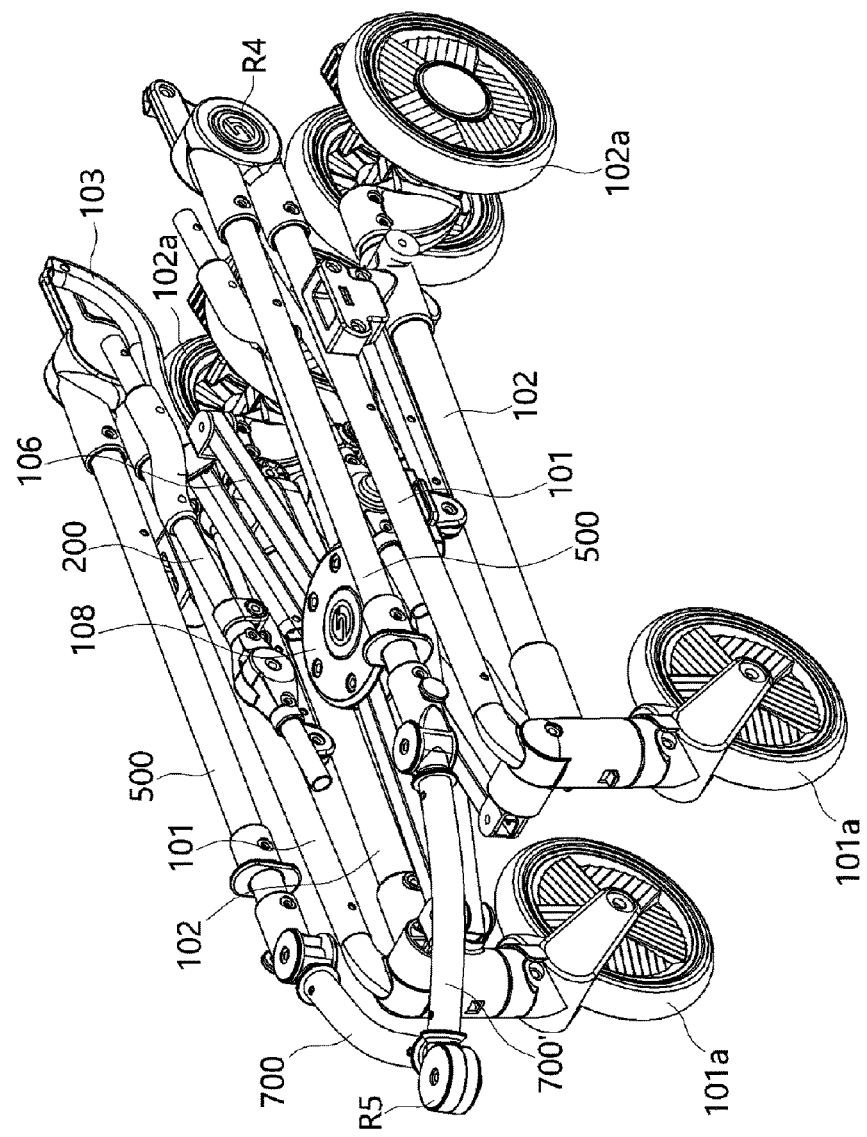
FIG. 9 is a view illustrating a folded state of a twice-foldable stroller according to an embodiment of the present disclosure.

FIG. 3 is a front perspective view of a twice-foldable stroller according to an embodiment of the present disclosure, FIG. 4 is a rear perspective view of a twice-foldable stroller according to an embodiment of the present disclosure, FIG. 5 is a side view of a twice-foldable stroller according to an embodiment of the present disclosure, FIG. 6 is an exploded perspective view of an axis connecting part according to an embodiment of the present disclosure, FIG. 7 is an exploded perspective view of a front wheel portion according to an embodiment of the present disclosure, FIG. 8A and FIG. 8B are exploded perspective views of a rear wheel portion according to an embodiment of the present disclosure, and FIG. 9 is a view illustrating a folded state of a twice-foldable stroller according to an embodiment of the present disclosure, wherein a twice-foldable stroller of the present disclosure includes, a frame main body 100 which is configured to have right and left front-angle frames 101 to support front wheels 101$a$ and a horizontal frame 101' connected at a lower part between the right and left front-angle frames 101, right and left rear-angle frames to support rear wheels 102$a$ and connecting frames 102' connected between the right and left rear-angle frames 102 and the right and left front-angle frames 101, and vertical frames 103 connected to the right and left connecting frames 102'; seat frames 200 connected to the right and left vertical frames 103; backrest frames 300 rotatably connected to the seat frames 200; support frames 400 which connect and support respective backrest frames 300; extension frames 500, each connected to the right and left front-angle frames 101 via rotational axes R3 and R4, respectively; canopy frames 600 and 600' rotatably connected to the extension frames 500 for sunshade; and handles 700 and 700', each connected to the extension frames 500 wherein right and left central portions are rotatably connected to each other, wherein each of the front wheels 101$a$ and the front-angle frames 101 are rotatable via rotational axes R1 and R2, the front-angle frames 101 and the extension frames 500 are rotatable via rotational axes R3 and R4, and the handles 700 and 700' are rotatable via a rotational axis R5.

A rotary plate 800 is provided at a center of the frame main body 100, and a connection end peripheral to the rotary plate 800 of, a frame 104 connected between the rotary plate 800 and a front wheel 101$a$, a frame 105 connected between the rotary plate 800 and a rear-angle frame 102, and a frame 106 connected between the rotary plate 800 and a vertical frame 103, are configured to be rotatable.

The front wheels 101$a$ may have a caster structure for easier handle control when driving.

Further, each of the rotational axes R3 and R4 where the front-angle frames 101 and the extension frames 500 are connected is configured to have a protruding shaft 500$a$ at a center formed at a front end of an extension frame 500 to be rotatably coupled to a coupling device 101$b$ of a front end of a front-angle frame 101 with a coupling plate 101$c$ via a coupling device 501 and a washer 502 inserted inside the coupling device 501, and a coupler 503 is coupled to an outer side of the coupling device 501 via a fixing device 504 and then covered with a cover 505.

The front wheel 101$a$ portion is configured to have, an end of the front-angle frame 101 and an end of the frame 104 to be rotatably coupled to a coupling device 101$b$ formed at a front end of a rear-angle frame 102, a coupler 101$c$ inserted in the coupling device 101$b$, a connecting device 101$d$ connected to the coupler 101$c$, a wheel fixing device 101$e$ connected to the connecting device 101$d$, and the front wheel 101$a$ is rotatably fixed to the wheel fixing device 101$e$ via a pin 101$f$.

In addition, the rear wheel 102$a$ portion is configured to have a wheel fixing device 102 connected to a coupling device 102$b$ formed at a rear end of a rear-angle frame 102, and rear wheels 102$a$ are rotatably fixed right and left of the wheel fixing device 102$c$, and a brake 102$d$ is fastened to a rear of the wheel fixing device 102$c$.

Next, the action of the twice-foldable stroller configured as mentioned above is described in detail.

First, since the stroller is used at a state where a frame of a frame structure as illustrated in FIG. 3 is covered with a cover, the state of having a cover covering the frame is assumed and described.

In the frame structure as illustrated in FIG. 3, a child is seated on the seat frame 200 with the child facing forward, and depending on the weather, that is, depending on the amount of sunlight, the canopy frames 600 and 600' are folded or unfolded. The horizontal frame 101' is used as a foot rest and the handles 700 and 700' are grabbed and pushed to move around. At this time, both the child and guardian pushing the stroller is facing forward.

On the other hand, when the stroller is not in use, the canopy frames 600 and 600' are folded to be in line with the handles 700 and 700'. When the handles 700 and 700' are pushed downwards, the handle 700 rotates clockwise and the handle 700' rotates counterclockwise, and the peripheral end of each of the frames connected to the rotary plate 800 rotate to allow horizontal folding, which reduces the width of the stroller.

At this state, when the extension frames 500 are rotated about rotational axes R3 and R4 to be moved over to the front side while pushing downwards, the front-angle frames 101 rotate about the rotational axes R1 and R2 to be folded in parallel to the rear-angle frames 102, and the extension frames 500 are folded to a state as illustrated in FIG. 9, parallel to the front-angle frames 101 and rear-angle frames 102.

In addition, when the stroller is to be unfolded, by operating the stroller at an inverse order of the folding actions of the above-described stroller, the stroller is unfolded.

Although the detailed exemplary embodiment of the present disclosure has been described above, it is apparent that various modifications can be made without departing from the scope of the present disclosure.

The present disclosure is advantageous is that it is possible to significantly reduce the volume of a stroller by folding it twice, in which the stroller is folded again vertically when being in a horizontally folded state, and since it has a simple structure, it is possible to easily manufacture at a low cost as well as convenient to use, and can be used stably long term without breaking, which is economical and long lasting.

What is claimed is:

1. A twice-foldable stroller comprising:
   a frame main body which is configured to have right and left front-angle frames to support right and left front wheels, respectively, and a horizontal frame connected at a lower part of the right and left front-angle frames between the right and left front-angle frames, right and left rear-angle frames to support right and left rear wheels, respectively, and right and left connecting frames connected between the right and left rear-angle frames and the right and left front-angle frames, respectively, and right and left vertical frames connected to the right and left connecting frames, respectively;
   right and left seat frames connected to the right and left vertical frames, respectively;
   right and left backrest frames rotatably connected to the right and left seat frames, respectively;
   right and left support frames which connect and support respective right and left backrest frames;
   right and left extension frames, each connected to the right and left front-angle frames via first, right and left rotational axes, respectively;
   right and left canopy frames rotatably connected to the right and left extension frames; and
   right and left handles, each connected to the right and left extension frames, respectively,
   wherein each of the right and left front wheels and the right and left front-angle frames are rotatable via second, right and left rotational axes, respectively, the right and left front-angle frames and the right and left extension frames 500 are rotatable via the first, right and left rotational axes, and the right and left handles are rotatable via a third rotational axis.

2. The stroller of claim 1, wherein a rotary plate is provided at a center of the frame main body, and a connection end peripheral to the rotary plate of, a frame connected between the rotary plate and one front wheel of the right and left front wheels, a frame connected between the rotary plate and one of the rear angle frame of the right and left real angle frames, and a frame connected between the rotary plate and one of the vertical frames of the right and left vertical frames, are configured to be rotatable.

3. The stroller of claim 1, wherein each of the right and left front-angle frames has a coupling device at the right and left axes,
   wherein each of the right and left rotational axes is configured to have:
      a protruding shaft at a center formed at a front end of the respective right and left extension frames to be rotatably coupled to the coupling device with a coupling plate via a coupling device and a washer inserted inside the coupling device, and
      a coupler coupled to an outer side of the coupling device via a fixing device and then covered with a cover.

4. The stroller of claim 2, wherein the stroller has right and left front wheel portions, each front wheel portion is configured to have, an end of the respective right and left front-angle frames and an end of the frame to be rotatably coupled to a coupling device formed at a front end of the respective right and left rear-angle frames, a coupler inserted in the coupling device, a connecting device connected to the coupler, a wheel fixing device connected to the connecting device, and a respective front wheel of the right and left front wheel is rotatably fixed to the wheel fixing device via a pin 101*f*.

5. The stroller of claim 1, wherein each of the right and left rear wheels includes a pair of wheels, and
   wherein the stroller has right and left wheel portions, each rear wheel portion is configured to have:
      a wheel fixing device connected to a coupling device formed at a rear end of the respective right and left rear-angle frames, and the wheels of the pair of wheels are rotatably fixed right and left of the wheel fixing device, and
      a brake is fastened to a rear of the wheel fixing device.

* * * * *